United States Patent
Dann et al.

[11] 3,892,506
[45] July 1, 1975

[54] PROJECTION FORMING OF THREE-DIMENSIONAL METAL OBJECTS

[76] Inventors: Fred M. Dann, 130 Cliff, Sun Prairie, Wis. 53590; James Reigel, 4725 Cottage Grove Rd., Madison, Wis. 53716

[22] Filed: June 28, 1973

[21] Appl. No.: 374,307

[52] U.S. Cl. ............... 425/78; 425/3; 425/174.8 E; 425/405 R
[51] Int. Cl. ............................................ B29c 11/00
[58] Field of Search ........ 425/3, 78, 174.8 E, 405 R

[56] References Cited
UNITED STATES PATENTS

| | | |
|---|---|---|
| 2,902,714 | 9/1959 | Johnson .................... 425/174.8 E X |
| 3,578,739 | 5/1971 | George ...................... 425/174.8 E X |
| 3,851,023 | 11/1974 | Brethauer et al. ........ 425/174.8 E X |

*Primary Examiner*—J. Howard Flint, Jr.
*Attorney, Agent, or Firm*—Andrus, Sceales, Starke & Sawall

[57] ABSTRACT

Metallic particles are heated to a coherent bonding state, are provided with an electric charge and accelerated into and through an evacuated chamber. Means associated with the chamber continuously control the directional path of the moving particles in accordance with the shape of the article to be formed. The projected particles then impinge upon a target at one end of the chamber to build up the three-dimensional object desired.

16 Claims, 10 Drawing Figures

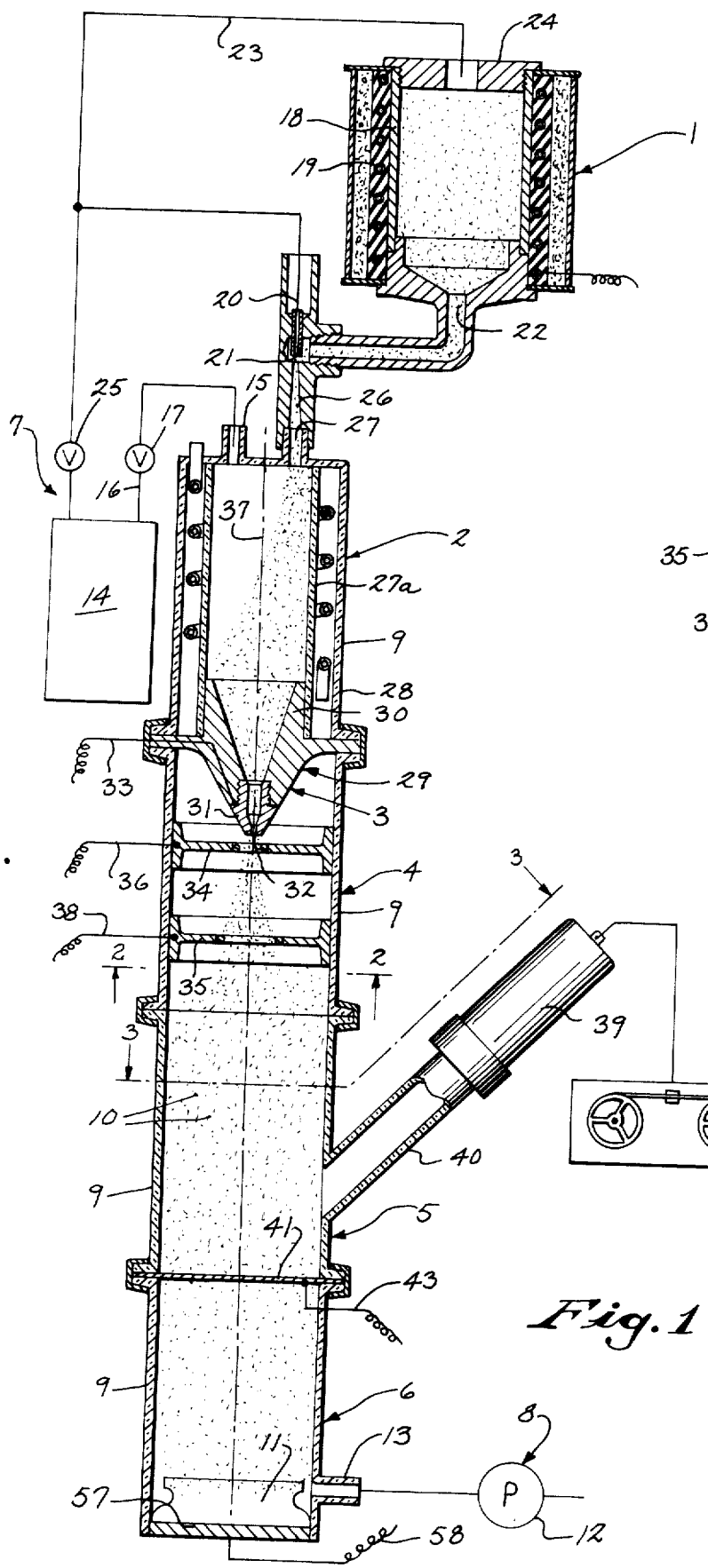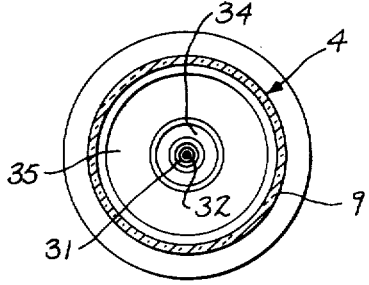

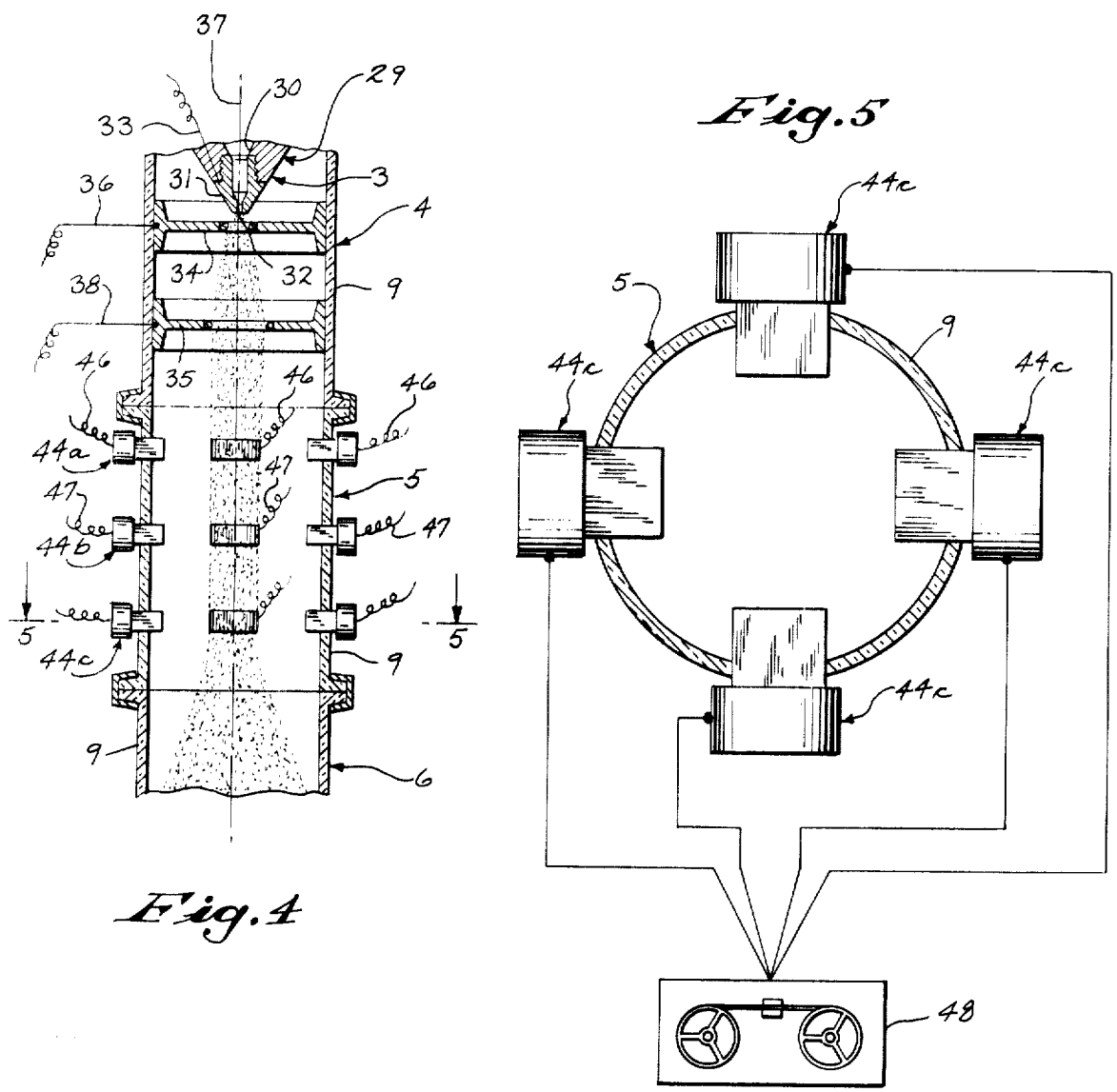

PROJECTION FORMING OF THREE-DIMENSIONAL METAL OBJECTS

BACKGROUND AND SUMMARY OF THE INVENTION

This invention relates to projection forming of three-dimensional metal objects.

In the present art of forming metal into various geometric forms, molding and casting processes are usually utilized. These processes require expensive tooling and dies, and are time consuming and expensive from the labor standpoint as well. Furthermore, and referring especially to casting, difficult problems occur with gas inclusions, segregation and distortion.

Some formation of geometric metal pieces is also done by weld fabrication techniques, such as fusion welding, but these techniques are also subject to numerous disadvantages such as those mentioned above in regard to casting.

Furthermore, all present forming of three-dimensional metal objects is subject to severe tolerance limitations so that uniform forming of complex shapes within very small tolerances is very difficult, if not impossible.

The present invention solves the aforementioned and other problems and provides an extremely unique concept of three-dimensional metal object formation.

Broadly in accordance with the invention, metallic particles are heated to a coherent bonding state, are provided with an electric charge and accelerated into and through an evacuated chamber. Means associated with the chamber continuously control the directional path of the moving particles in accordance with the shape of the article to be formed. The projected particles then impinge upon a target at one end of the chamber to build up the three-dimensional object desired.

DESCRIPTION OF THE DRAWINGS

The accompanying drawings illustrate the best mode presently contemplated by the inventors for carrying out the invention.

In the drawings:

FIG. 1 is a schematic longitudinal sectional view of projection forming apparatus constructed in accordance with the concepts of the invention;

FIG. 2 is a transverse sectional view taken on line 2—2 of FIG. 1;

FIG. 3 is a transverse sectional view taken on line 3—3 of FIG. 1;

FIG. 4 is a fragmentary schematic longitudinal sectional view showing one form of quadrupole control means;

FIG. 5 is a transverse sectional view taken on line 5—5 of FIG. 4;

DESCRIPTION OF THE PREFERRED EMBODIMENT

Figure 6:
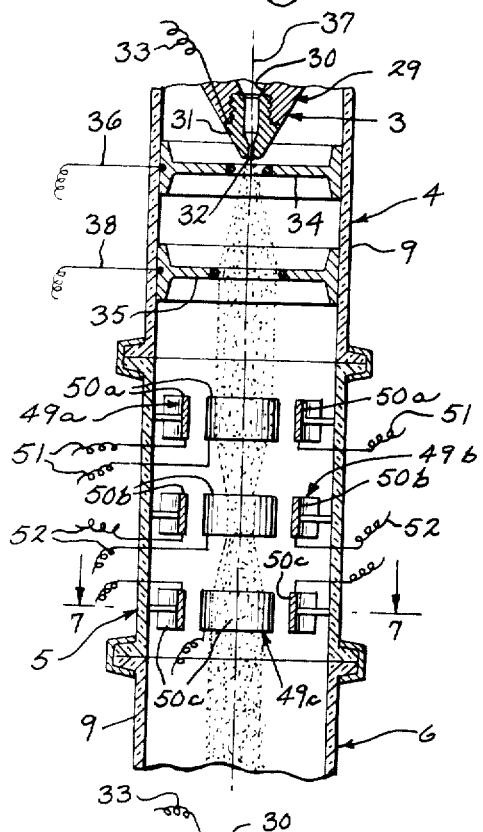
FIG. 6 is a view similar to FIG. 4 and showing another form of quadrupole control means.

As shown in FIGS. 1–3 of the drawings, the projection forming device primarily comprises a storage and inject stage 1, an induction stage 2, a particle charging stage 3, an accelerator stage 4, a planular image generation stage 5, and an impingement stage 6. In addition to the above stages, the device includes a backflow gas supply system 7 and an evacuating system 8.

Stages 2 thru 8 are preferably disposed in a vertical assembly of axially aligned tubular high strength pipes 9 which are sealed together in any suitable way to form a columnar chamber. Pipes 9 may be made of glass or any other suitable material.

The invention contemplates taking a supply of discrete metallic particles 10 at storing stage 1 and forming the particles into a three-dimensional object 11 at impingement stage 6. The particles are preferably in the form of a fine metal powder with a ferrous or other similar suitable content.

To prevent interference with the process by reactive atmospheric constituents, such as oxygen, the longitudinal chamber assembly is first evacuated. For this purpose, evacuation system 8 comprises a suitable vacuum pump 12 which is attached to an outlet 13 in the downstream pipe 9. Other pumps in other positions within the column may be utilized to obtain the desired results. In addition, it is desirable to purge any reactive atmospheric elements not removed by pump 12. For this purpose, backflow supply system 7 comprises a tank 14 or other suitable slightly pressurized source of inert backfilling gas, such as Argon. Tank 14 is connected to an inlet 15 to induction stage 2, as by a gas line 16 having a control valve 17 therein.

At storage and inject stage 1, metal particles 10 are held within a hopper 18 and preheated by a suitably actuated heater coil 19. This pre-heating speeds up subsequent treatment of the metal at induction stage 2 and reduces oxides and other impurities in the metal which may affect the final product.

Means are provided in conjunction with storage and inject stage 1 to inject a continuous stream of particles 10 from hopper 18 into induction stage 2. For this purpose, a siphon system including a tube 20 having a restricting discharge orifice 21 is disposed closely adjacent the discharge port 22 of hopper 18. Gas tank 14 is connected via a dual line 23 to the inlet of tube 20 as well as the inlet end 24 of hopper 18. A valve 25 in line 23 controls the flow of gas into hopper 18 and tube 20. Opening of valve 25 causes gas to flow into hopper 18 for purging and equalizing of the vacuum condition. Furthermore, gas flowing through orifice 21 in combination with the vacuum will cause a high speed flow of particles 10 from hopper 18 through a nozzle 26 and aspirating injection thereof into stage 2 through a second inlet 27.

Induction stage 2 contains a ceramic-like tubular structure 27a surrounded by a suitably actuated induction coil 28 for purposes of heating particles 10 injected from stage 1. At this point it is desirable to heat the particles to a coherent bonding state which is a near molten or plastic-like condition.

The combination of gravity and inject speed and thermal motion will now carry the plasticized or molten metal particles through the tubular induction chamber to particle charging stage 3. This stage is shown as comprising a generally cone-shaped stripper nozzle 29 having a main body portion 30 of non-conducting ceramic material or the like, and a tip portion 31 of an electrically conducting material capable of withstanding the high temperature of the heated particles 10. Tip portion 31 has a small orifice 32 for passage of the particles therethrough.

Stage 3 is provided with means to induce a positive charge on particles 10 as they funnel therethrough. For this purpose, a charging wire 33 is connected to tip 31 and is suitably provided with a high positive D.C. potential. The charged tip 31 thus charges particles 10, so that they take on a positive charge as they flow onward to accelerator stage 4.

Stage 4 positions the flow of particles 10 and acceleratingly projects them forwardly. For this purpose, a plurality such as a pair of metallic rings 34, 35 are mounted in pipe 9 downstream from nozzle 29. Ring 34 is disposed closely adjacent nozzle 29 and is electrically grounded, as through a wire 36. It functions to center the flow of positively charged particles 10 and direct them on a discrete path along or parallel to the straight longitudinal axis 37 of the columnar assembly. Ring 35 is on the side of ring 34 remote from nozzle 29 and is suitably provided with a high negative D.C. potential, as through a wire 38. Ring 35 has a larger central opening than ring 34 and functions to accelerate particles 10 beyond their initial velocity to a higher velocity.

The charges on tip 31 and rings 34, 35 depend upon variables such as: magnitude of particle charge; size, mass and composition of particle; as well as velocity and other factors.

The accelerated particles, now traveling at high speed, next enter planular image generation stage 5. At this stage, the particles are re-aligned into a continuously variable two-dimensional image corresponding at any one instant with the desired planular configuration of the final object 11 at any one place. For this purpose, and in the embodiment shown in FIGS. 1–3, the image generator comprises an electron gun 39 mounted in a cylindrical arm 40 extending angularly from the column downstream from stage 4. Gun 39 may be of the video tube type and projects an electron image onto a matrix 41 disposed across the columnar chamber and in the path of particles 10. Gun 39 is controlled to project a continuous series of two-dimensional electronic images onto matrix 41 and which may continuously change to prescribe, through a lapse of time, the complete three-dimensional form of the final object 11. For this purpose, a suitable video tape input unit 42 or similar signal generator is connected to the input of gun 39. The tape thereon is recorded with programmed signals simulating the image of each plane to be formed in object 11 and which continuously change based upon non-uniformity in planular configuration.

Matrix 41 comprises a perforated sheet of steel or the like which is electrically induced with a high frequency low amplitude sinusoidal signal superimposed upon a positive constant D.C. voltage, as by a wire 43. The characteristics of the charge depend upon variables such as the intensity of the electron beam from gun 39 and the variables mentioned heretofore. Projection of the electron beam by gun 39 will selectively "open" and "close" the various matrix openings, electrically speaking, to permit or prevent passage of particles 10 therethrough. Thus, at any given instant a planular image simulating a plane to be formed in object 11 will be imposed on the particles by selectively allowing them to pass through matrix 41 in discrete positions for projection toward the target.

The embodiment of FIGS. 1–3 incorporates a planular image generation system of the matrix type. Alternate systems may be used and which embody the quadrupole concept. Two quadrupole embodiments will now be described.

In the embodiment of FIGS. 4 and 5, a plurality of sets 44a, 44b and 44c of electromagnets are spaced longitudinally along the chamber and downstream from rings 34, 35. These sets comprise a plurality, such as four, of electromagnets 45a, 45b and 45c respectively, which are annularly spaced peripherally on the chamber and particle path and with their poles extending slightly thereinto.

The first and second sets 44a, 44b of electromagnets 45a, 45b are connected through wires 46, 47 to suitable well-known control mechanism, not shown, which imposes a D.C. magnetic field upon the quadrupole in a manner to center and focus the stream of particles generally along axis 37. The third set 44c of electromagnets 45c is downstream from the focusing sets and is connected to a signal control tape unit or signal generator 48, somewhat similar to unit 42, which varies the magnetic field between the magnets to deflectingly steer or scan the stream of particles transversely, to thus create the planular image desired.

Figure 7:
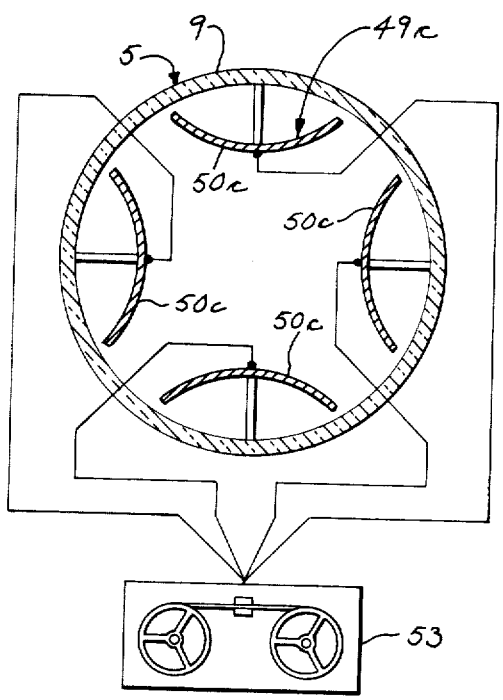
FIG. 7 is a transverse sectional view taken on line 7—7 of FIG. 6.

In FIGS. 6 and 7, the sets of electromagnets are replaced with a plurality of sets 49a, 49b and 49c of curved electrostatically chargeable plates 50a, 50b and 50c. Sets 49a and 49b are connected through wires 51, 52 to suitable well-known control mechanism, not shown, which imparts a suitable charge in a manner to center and focus the stream of particles generally along axis 37. Third set 49c is connected to a suitable signal generator such as tape unit 53, which functions similar to unit 48.

In some instances, a few of the particles 10 in the stream may not be properly responsive to the steering control of the quadrupole units of FIGS. 4–7. This may be due to a number of factors, such as the existence of a few particles in the stream which are of the wrong mass, charge or density. These undesirable particles can be effectively eliminated by means to test the steerability of all the particles in the stream, together with means to eliminate those particles which do not properly respond to the steering control. These means can be utilized in conjunction with either of the quadrupole embodiments described above, but will be described here only in connection with the electrostatic concept.

Figure 8:
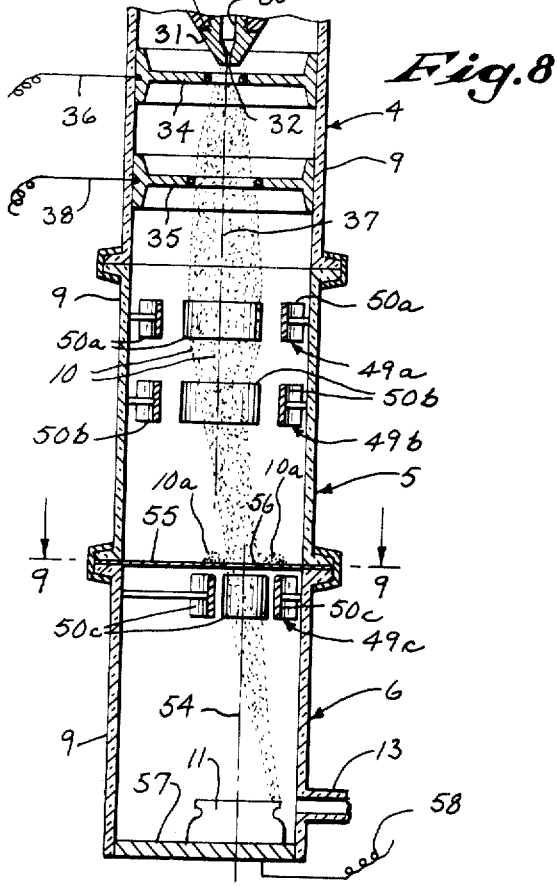
FIG. 8 is a fragmentary schematic longitudinal sectional view showing the steerability test and particle removal apparatus.
Figure 9:
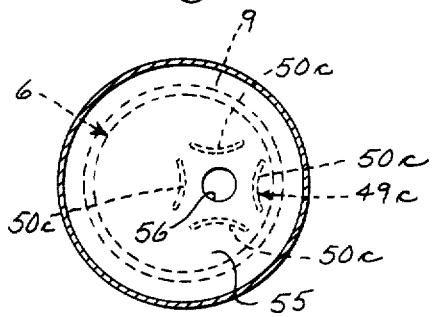
FIG. 9 is a transverse sectional view taken on line 9—9 of FIG. 8.

FIGS. 8 and 9 show a portion of a projection forming apparatus somewhat similar to FIGS. 6 and 7. However, in this instance the third set 49c of annularly arranged plates 50c is offset from around main axis 37 and forms a supplemental axis 54. In addition, sets 49a and 49b act as electromagnetic focusing lenses and are controlled to steer the stream of particles 10 laterally away from axis 37 and into conjunction with axis 54 just upstream from plates 50c. At this point, a plate 55 is disposed transversely across the chamber, and is provided with an aperture 56 substantially smaller than the distance between opposite plates 50c. Those particles 10 which properly respond to the offset steering forces of sets 49a and 49b will pass through the aperture, while those individual particles 10a which do not respond properly will engage plate 55 itself and not progress further. Since the object 11 will, in this case, be projection formed from a stream of more accurately controlled particles, it will be of higher quality.

It is contemplated that any embodiment of planular image generator can be programmed to prescribe an infinite number of shapes an infinite number of times.

Now that particles 10 have been heated, given a charge, velocity, and selected path, they proceed to the final (impingement) stage 6. For this purpose, the downstream end of the columnar assembly is closed by a support plate 57 suitably secured thereto by clamps (not shown) or any other desired means. Plate 57 comprises the target against which particles 10 initially impinge; but after particles form the initial layer, subsequent particles impinge and build upon them to form a metallurgically bonded three-dimensional object 11.

If desired, plate 57 may be grounded, as by a wire 58, to dissipate any charge on the particles. It may even be desired to provide a negative charge to plate 57 to assure final particle flow in a direction normal to the plane of the plate.

The impact velocity combined with the plasticity of the heated particles will assure metallurgical bonding to any desired density throughout object 11, in view of the controlled plastic impaction that takes place.

Figure 10:
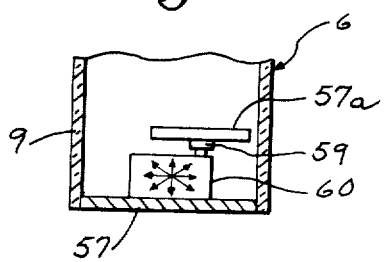
FIG. 10 is a fragmentary view showing a movable target.

In some instances, it may be desirable to combine the planular image generation concept with a movable target. As shown in FIG. 10, target 57a is mounted on a support 59 within the chamber. Support 59 is moved by any well-known servo-controlled motor system 60 to move the target in the X, Y and Z directions, as well as to index or tilt the target.

The continuously variable projection concept of the invention permits the relatively fast manufacture of simple and complex metallic shapes. Part edges, undercuts, sides and planes can be built up with exacting tolerances, limited only by the metal particle size.

Various modes of carrying out the invention are contemplated as being within the scope of the following claims particularly pointing out and distinctly claiming the subject matter which is regarded as the invention.

We claim:

1. An apparatus for projection forming of a threedimensional object from metallic particles such as metal powder and the like, comprising, in combination:
   a. means to form a moving stream of the said particles,
   b. means to heat said stream of particles to a coherent bonding state,
   c. planular image generating means disposed and operative to continuously impose a variable two-dimensional image on said stream of heated particles,
   d. and a target disposed downstream from said planular image generating means for impingement thereon by said particles and build-up thereon of a three-dimensional object corresponding in shape to the image continuously imposed on said particles by the planular image generating means.

2. In the apparatus of claim 1:
   a. a columnar chamber through which said particles flow,
   b. means for evacuating said chamber of essentially all reactive atmospheric elements,
   c. and means for supplying inert backfilling and purging gas to said chamber.

3. The apparatus of claim 1
   a. in which said heating means comprises:
      1. a tubular chamber,
      2. and selectively actuatable induction heating coils disposed about said chamber,
   b. and in which said stream forming means includes means to inject a stream of said particles into said chamber.

4. In the apparatus of claim 1: means disposed upstream from said image generating means to impart a positive charge to said stream of particles.

5. The apparatus of claim 4 in which said charge imparting means comprises:
   a. a nozzle disposed in the path of said particles,
   b. said nozzle having at least its tip portion of electrically conductive material,
   c. and means to provide a high positive potential to said tip portion.

6. In the apparatus of claim 1: means disposed downstream from said heating means to direct the flow of particles along a generally straight path.

7. In the apparatus of claim 6: means disposed adjacent said flow directing means to accelerate said particles to a higher velocity.

8. The apparatus of claim 7 in which:
   a. said flow directing means comprises a first metallic ring through which the said particles flow, said ring being electrically grounded,
   b. and said accelerating means comprises a second metallic ring through which said particles flow, said second ring having an electrical charge.

9. The apparatus of claim 1 in which said planular image generating means comprises:
   a. a perforated matrix disposed in the path of the said heated particles,
   b. an electron gun disposed to project an electron image onto said matrix,
   c. and continuously variable signal control means connected to said electron gun.

10. The apparatus of claim 1 in which said planular image generating means comprises:
    a. a plurality of longitudinally spaced sets of electromagnets with the electromagnets of each set being disposed about the path of said heated particles in said chamber and forming a magnetic field in the particle path,
    b. at least one of said sets being controllable to focus said stream of particles,
    c. and continuously variable signal generating means connected to another of said sets for varying the said magnetic field to cause scanning of said stream of particles.

11. The apparatus of claim 1 in which said planular image generating means comprises:
    a. a plurality of longitudinally spaced sets of electrostatic plates with the plates of each set being disposed about the path of said heated particles in said chamber and forming an electrical field in the particle path,
    b. at least one of said sets being controllable to focus said stream of particles,
    c. and continuously variable signal generating means connected to another of said sets for varying the said electrical field to cause scanning of said stream of particles.

12. The apparatus of claim 1 which includes:
    a. means disposed upstream from said target to test the steerability of all particles in said stream, b. and means to remove those particles from said stream which lack the desired steerability.

13. The apparatus of claim 1 in which said target is selectively movable.

14. The apparatus of claim 1 in which said target is electrically grounded.

15. The apparatus of claim 1 in which said target is electrically charged.

16. An apparatus for projection forming of a threedimensional object from metallic particles such as metal powder and the like, comprising, in combination:
 a. a columnar chamber,
 b. means for evacuating said chamber of essentially all reactive atmospheric elements,
 c. a source of inert gas,
 d. means connecting said source with an inlet to said chamber for supplying backfilling and purging gas thereto,
 e. means connected to said source for forming a moving stream of said particles within the inlet portion of said chamber,
 f. induction heating means disposed adjacent the inlet portion of said chamber to heat said stream of particles to a coherent bonding state,
 g. a nozzle disposed in said chamber and with said nozzle having at least its tip portion of electrically conductive material,
 h. means to provide a high positive potential to said tip portion to thereby impart a positive charge to said stream of particles passing therethrough,
 i. an electrically grounded first metallic ring disposed downstream from said nozzle within said chamber and through which said particles pass, said first ring directing the flow of particles along a generally straight path,
 j. a negatively charged second metallic ring disposed downstream from said nozzle within said chamber and through which said particles pass, said second ring accelerating said particles to a higher velocity,
 k. planular image generating means disposed downstream from said rings and operative to continuously impose a variable two-dimensional image on said stream of heated particles,
 l. and a target disposed at the downstream end of said chamber for impingement thereon by said particles and build-up thereon of a three-dimensional object corresponding in shape to the image continuously imposed on said particles by said image generating means.

* * * * *